United States Patent [19]

Ross

[11] Patent Number: 4,871,514
[45] Date of Patent: Oct. 3, 1989

[54] FLAPPER VALVE
[75] Inventor: Mark S. Ross, Lawrenceville, N.J.
[73] Assignee: Mobil Oil Corporation, New York, N.Y.
[21] Appl. No.: 118,080
[22] Filed: Nov. 9, 1987
[51] Int. Cl.[4] .......................... F27B 15/02; F27B 15/09
[52] U.S. Cl. .................... 422/145; 137/527.6; 137/527.8; 422/114; 422/144
[58] Field of Search ............... 422/144, 145, 114, 214; 137/527.6, 527.8

[56] References Cited

U.S. PATENT DOCUMENTS

| 197,838 | 12/1877 | Downey | 137/527.8 |
|---|---|---|---|
| 2,187,487 | 1/1940 | Burt | 137/527.6 |
| 2,259,128 | 10/1941 | Egan | 137/527.6 |
| 2,694,358 | 11/1954 | Taylor | 137/527.6 |
| 2,838,062 | 6/1958 | Held et al. | 137/527.6 |
| 2,838,063 | 6/1958 | Weits et al. | 137/527.6 |
| 2,838,065 | 6/1958 | Held et al. | 137/527.6 |
| 2,901,331 | 8/1959 | Held et al. | 137/527.6 |
| 3,140,724 | 7/1964 | Dietert et al. | 137/527.6 |
| 3,213,879 | 10/1965 | Thompson | 137/527.8 |
| 3,273,320 | 9/1966 | Delaune et al. | 55/267 |
| 3,613,720 | 10/1971 | Welch | 137/527.8 |
| 3,785,962 | 1/1974 | Conner et al. | 422/139 X |
| 4,074,691 | 2/1978 | Luckenbach | 137/527.6 |
| 4,246,231 | 1/1981 | Figler et al. | 422/147 |
| 4,396,034 | 2/1983 | Cherniak | 137/527.8 |
| 4,407,325 | 10/1983 | Cherniak | 137/527.8 |
| 4,446,107 | 5/1984 | Buyan et al. | 422/147 X |
| 4,477,053 | 10/1984 | Jandrasi | 251/86 |
| 4,701,307 | 10/1987 | Walters et al. | 422/145 X |

FOREIGN PATENT DOCUMENTS

| 0004849 | of 1907 | United Kingdom | 137/527.6 |
|---|---|---|---|
| 0628859 | 3/1948 | United Kingdom | 137/527.6 |

Primary Examiner—Barry S. Richman
Assistant Examiner—Amalia L. Santiago
Attorney, Agent, or Firm—Alexander J. McKillop; Charles J. Speciale; Malcolm D. Keen

[57] ABSTRACT

A flapper valve for sealing the cyclone diplegs on a fluid catalytic cracking unit has conical sealing surfaces provided between the movable valve body and the valve seat on the bottom of the cyclone dipleg. In addition, a retaining ring around the movable valve body retains catalyst on the valve body when the valve is in its horizontal, closed position to improve sealing.

13 Claims, 4 Drawing Sheets

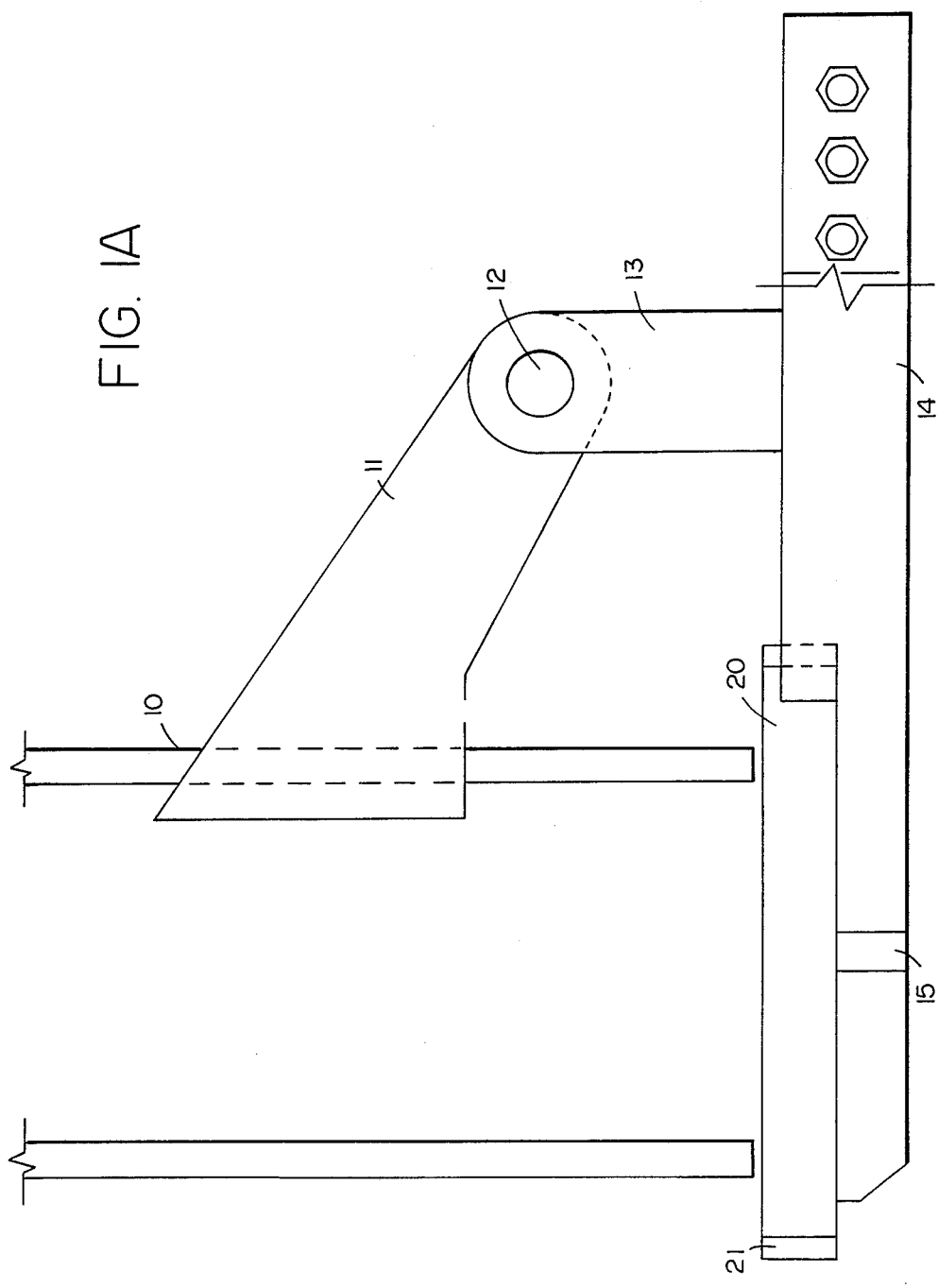

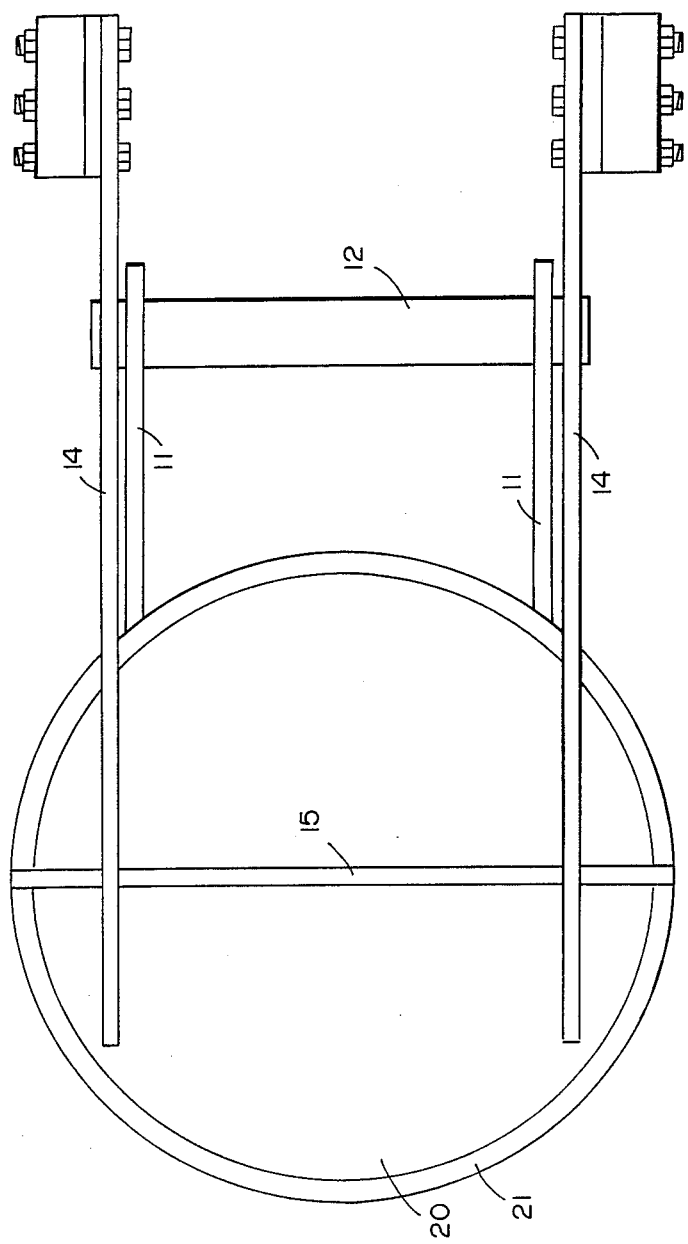
FIG. IC

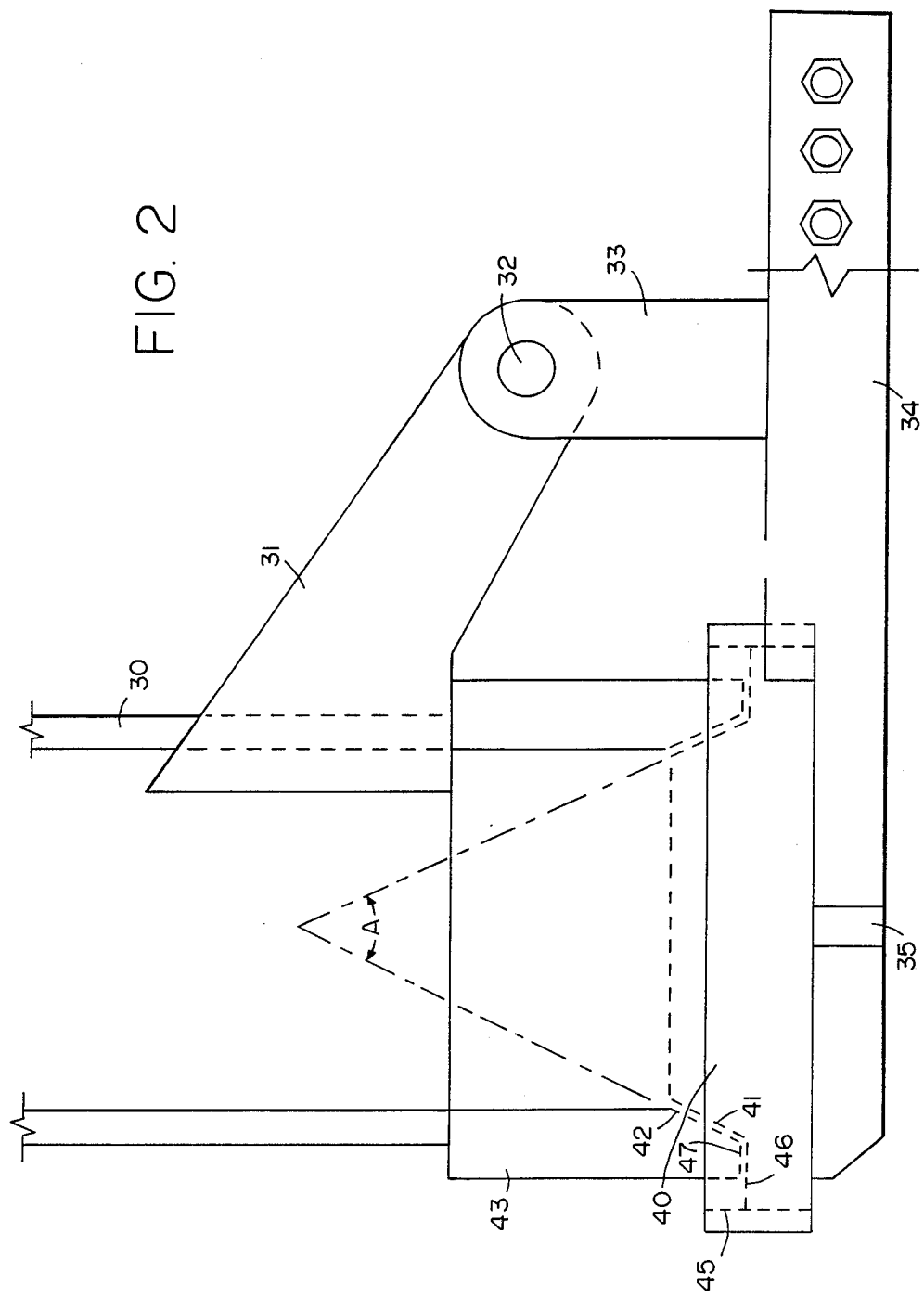

FLAPPER VALVE

FIELD OF THE INVENTION

The present invention relates to a flapper valve which is especially useful in fluid catalytic cracking (RCC) units.

BACKGROUND OF THE INVENTION

The fluid catalytic cracking process has reached a preeminent position in the petroleum industry in the United States for the production of gasoline and middle distillate boiling range products from higher boiling feeds such as vacuum gas oils. The essentials of the process are well defined and described, for example, in "Fluid Catalytic Cracking with Zeolite Catalysts," Venuto et al, Marcel Dekker New York, 1979, *Modern Petroleum Technology*, Ed. G. D. Hobson, Applied Science Publishers Ltd. 1973, to which reference is made for a general description of the FCC process. Most modern cracking units employ riser cracking in which the high boiling feed which is to be cracked is contacted with hot cracking catalyst in a vertical pipe or riser, after which the vaporous cracking products are separated from the spent cracking catalyst in a reactor vessel which surrounds the top of cracking riser. The separated catalyst is then passed to a regenerator in which the coke (a hydrocarbonaceous material which accumulates on the catalyst during the cracking) is oxidatively removed by contact with an oxygen-containing gas, usually air. Regeneration not only removes the coke from the catalyst but also provides heat from the endothermic cracking reactions; the hot, regenerated catalyst is returned from the regenerator vessel to the foot of the cracking riser for contact with additional cracking feed.

Separation of the catalyst from the cracking vapors is usually effected in one or more cyclone separators within the reactor vessel. The separator cyclones may be connected directly to the riser in order to effect an initial rapid separation of the cracking products from the spent catalyst and additional separators may be provided for separating catalyst from the vapors in the reactor. Cyclone arrangements are shown, for example, in U.S. Pat. No. 4,502,947 and 4,654,060 including an arrangement with a conduit connecting the riser cyclone to the reactor vessel cyclone so as to minimize contact between the cracking products and the catalyst in the reactor vessel. Reference is made to these patents for a disclosure of such cyclone arrangements. As shown there, the cyclones have dependent, vertical diplegs which extend down from the main body of the cyclone towards a dense, fluidized bed of the catalyst at the bottom of the reactor vessel. In order to provide the appropriate pressure differentials within the system, the diplegs may need to be sealed at the bottom. This may be done either by immersing the lower ends of the cyclone diplegs in the dense bed of catalyst or by employing a seal part, as shown in U.S. Pat. No. 4,502,947 and 4,654,060. Another alternative is to provide a flapper valve at the bottom of the dipleg, as shown, for example, in U.S. Pat. No. 3,785,962 (Conner et al) and U.S. Pat. No. 4,606,814 (Haddad).

Flapper valves used in FCCU are generally quite simple mechanical structures employing a horizontally hinged, flat metal plate which is biased towards a closed position at the bottom of the dipleg. Biasing is normally provided by means of a counterweight on the opposite side of the hinge from the valve plate. In addition, the pressure differential between the inside and outside of the diplegs normally helps to keep the valve closed. When the valve is in its normal closed position, catalyst accumulates in the dipleg of the cyclone until it reaches a predetermined height in the dipleg when the weight of the catalyst above the valve overcomes the biasing effect holding the valve closed so that the valve opens and releases catalyst from the dipleg. Initially, the flapper valve is held open by the flow of catalyst but eventually the biasing overcomes this resistance and the valve closes again until the catalyst builds up once again in the dipleg and forces the valve open. Proper functioning in the flapper valve is desirable at all times but especially during startup when it is necessary to establish the requisite pressure differentials in the system for feed, catalyst and product flow to take place. A flapper valve is described in U.S. Pat. No. 4,446,107 (Buyan) to which reference is made for a description of such a valve.

Existing flapper valves, by reason of their simple construction intended to withstand to stand the rigors of operation in the FCCU have given rise to certain problems. The catalyst is a relatively abrasive substance which, at the high temperatures encountered in the FCCU, tends to abrade and erode mechanical parts fairly rapidly unless adequate care is taken during design and fabrication. In any event, wear usually occurs on surfaces including the flapper valve and on the pivot pin about which the hinging frequently occurs. There is therefore, a continued need for improving the operation of FCCU flapper valves.

SUMMARY OF THE INVENTION

An improved flapper valve for FCCU operation has now been devised which reduces or eliminates the problems associated with current flapper valve design. The improved flapper valve according to the present invention provides positive dipleg sealing during the difficult stages of unit startup where catalyst flows and pressures are in a state of change as well as during normal operation where significant loading of catalyst is present. The improved valve also provides positive sealing in tertiary systems where the relatively low loadings of catalyst dust or fines have caused problems with current types of flapper valves.

According to the present invention the flapper valve for sealing the dipleg on FCCU cyclone separators comprises a movable support member hinged to the dipleg about a horizontal hinge axis. The support member can be moved between a normally closed position of the valve and an open position which permits catalyst to be released from the dipleg with biasing being provided to maintain the valve in the normally closed position against the weight of a predetermined height of catalyst in the dipleg. Biasing will normally be provided by means of a counterweight on the support member, in the conventional manner. A valve seat member is provided at the bottom of the dipleg which has a frusto-conical seating surface axially aligned with the dipleg, to provide sealing engagement with a valve body member on the moveable support member. The valve body member has a frusto-conical face complementary to the frusto-conical seating surface of the valve seat member so that when the valve is in its closed position, sealing is provided by means of the two complementary, mating, frusto-conical seating surfaces of the seat member and the body member.

The seating surfaces of the valve are preferably constituted by a wear-resistant or refractory material to avoid erosion by the abrasive catalyst particles and to this end, the body member and the seat member may be fabricated entirely of such a material or, alternatively, may be faced with such a material on the mating surfaces and any other surfaces over which the catalyst flows during normal operation. If the valve is installed so that it is horizontal when in the closed position, sealing will be improved by including an annular sealing ring around the valve body to retain a layer of catalyst on it when the valve is in the closed position.

THE DRAWINGS

In the accompanying drawings:

FIG. 1A is a vertical view of a conventional flapper valve,

FIG. 1C is a plan view from below of the valve of FIG. 1A,

FIG. 2 is a vertical cross-section of a flapper valve having frusto-conical sealing surfaces.

DETAILED DESCRIPTION

Figure 1B:
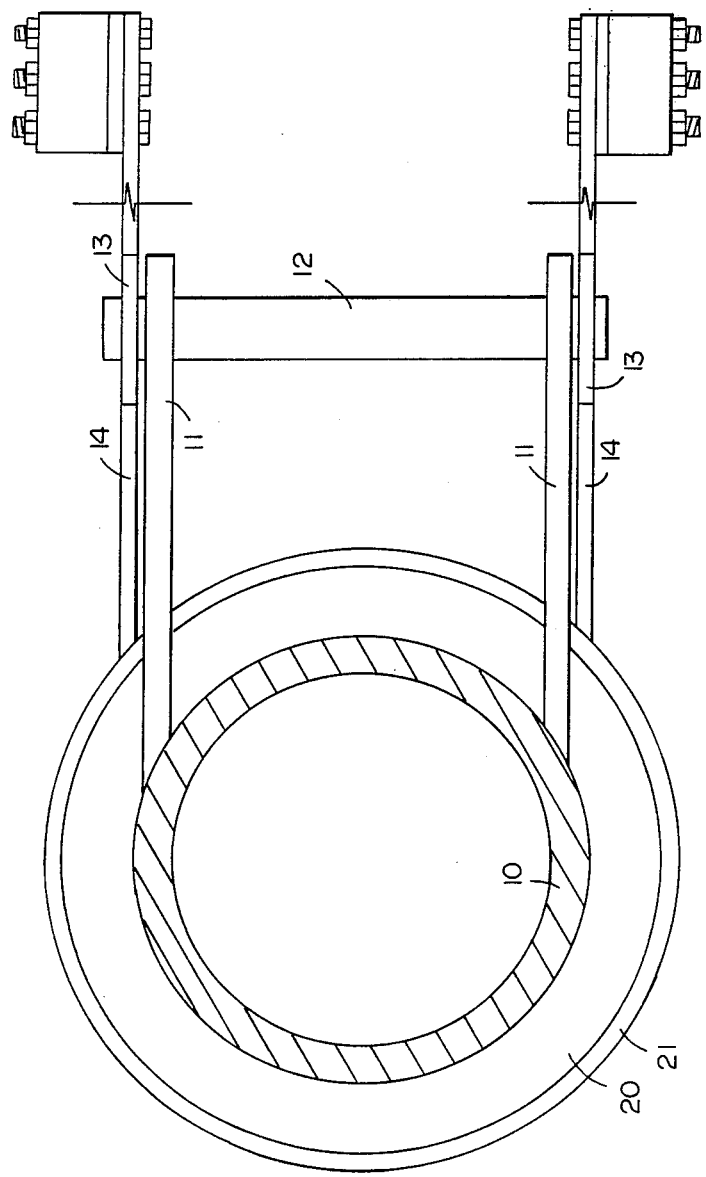
FIG. 1B is a plan view from above of the valve of FIG. 1A.

As described above, flapper valves are used at the lower ends of separator cyclones in FCCUs in order to maintain a predetermined height of catalyst in the dipleg above the valve. The valves are hinged about horizontal axes so as to permit them to open when the height of catalyst in the dipleg above the valve exceeds a predetermined value; the weight of catalyst pushes the valve open, permitting the catalyst to be discharged from the dipleg until the biasing on the valve closes it once more when the cycle repeats. In principle, the hinging could be carried out equivalently about a vertical axis with suitable biasing means e.g., a spring, provided for closing the valve, but conventionally a horizontal hinge axis is used with biasing towards the closed position of the valve provided by means of a counterweight on the opposite side of the hinge from the obturating or closing plate. The portion of the valve which closes the bottom of the dipleg may be vertical, horizontal or at any intermediate angle when the valve is in the closed position. U.S. Pat. No. 4,606,814 shows a valve which has the obturating member in the vertical position when the valve is closed and U.S. Pat. No. 3,785,962 shows a valve in which the obturating or closing member is horizontal when the valve is closed. U.S. Pat. No. 4,446,107 discloses a flapper valve which is inclined at an angle to the vertical axis of the dipleg when it is in the closed position. The angle selected for the closed position of the valve is generally a matter of choice and it does not significantly affect the operation of the valve, except as described below.

As shown in FIGS. 1A, 1B and 1C, a conventional flapper valve installed at the bottom of dipleg 10 of a cyclone separator in an FCCU reactor is horizontally hinged with the obturating or closing plate horizontal when the valve is in its normally closed position. The movable portion of the valve is suspended from twin suspension arms 11 by means of pivot pin 12 which passes through both suspension arms as well as through hanger arms 13 which are fixed to movable support arms 14. Support arms 14 are, in turn, attached to crossmember 15 which supports the valve obturating or closing plate 20. Plate 20 may be made of a solid sheet of heat resistant metal e.g., stainless steel, or alternatively may be fabricated of a refractory material with an annular reinforcing band 21 to provide additional support at its edges. The valve is biased towards its normally closed position with the obturating plate against the bottom edge of dipleg 10 by means of counterweights on the opposite end of support arms 14 from obturating plate 20.

The conventional type of flapper valve shown FIGS. 1A, 1B and 1C encounters a number of problems during normal use in FCCU's. In particular, wear on the pivot pin tends to lead to leakage between the bottom edge of the dipleg and the obturating plate and, in addition, the plate itself tends to become abraded and eroded away during use as the particles of catalyst flow over it at the high temperatures encountered during FCC operation.

The improved flapper valve according to the present invention reduces or eliminates the problems associated with the conventional type of flapper valve. FIG. 2 shows a flapper valve according to the present invention installed on a cyclone dipleg 30 with the hinge axis horizontal and with the valve obturating or closing plate horizontal in the normally closed position of the valve. The suspension and counterweighting arrangements for the valve are the same as those described above in connection with FIG. 1 with suspension arms 31 extending from the lower end of cyclone dipleg 30 and pivot pin 32 supporting hangar arms 33 which, in turn, are fixed to support arms 34 as in FIGS. 1A, 1B and 1C. Similarly, support for the valve obturating or closing plate 40 is provided by means of horizontal transverse member 35.

Obturating or closing plate 40 of the present valve is significantly thicker than the conventional obturating plate in order to provide the desired tapered seating surfaces for the valve. Obturating plate 40 is constituted by a body member which has a frusto-conical sealing face 41 which provides sealing engagement with a complementary concave sealing face 42 on valve seat member 43. Valve seat member 43 is secured to the bottom of cyclone dipleg 30 by means of welding or other appropriate means. Seat member 43 is made thicker than the dipleg so that a steep, long taper can be provided which will withstand erosion during use without an unacceptable deterioration in sealing. Thus, even though wear on the sealing surfaces and in the pivot pin and pivot pin hole will occur during use, sealing will be maintained. To this end, it is preferred that the cone angle A of the frusto-conical sealing surfaces should be less than 90°; although angles greater than about 90° will still provide a long sealing surface because of the relatively thick seat member 43, improved sealing is obtained with the steep cone angle as shown. However, in order to avoid wedging of the valve body within the seat member, it is preferred that the cone angle should not be less than about 40° and accordingly, cone angles between 50° and 90° are preferred.

As described above, the obturating plate may be fabricated of steel or a refractory material or of a composite structure with steel support members underlying or embedded in a refractory. Further, the sealing surfaces may be faced with a wear-resistant material or inserts of wear-resistant material may be provided so that the sealing surfaces themselves are of the wear-resistant material.

In order to improve sealing, a catalyst retaining ring 45 extends around valve body member 40, extending upwards from the annular region 46 around frusto-conical sealing surface 41. When the valve is in its closed position retaining ring 45 extends upwards above the lower edge 47 of valve seat member 43. The purpose of catalyst retaining ring 45 is to keep some catalyst on the surface of valve body member 40 when the valve is in the closed position, surrounding the lower edge 47 of valve seat member 43, to improve the sealing. The use of the catalyst retaining ring is particularly desirable when the valve is used with the secondary or tertiary cyclones in a catalyst separation system because the finely divided catalyst particles recovered in these separation stages create the greatest sealing problem with conventional flapper valves. The present construction with the annular retaining ring provides good sealing in these cases.

The valve provides improved sealing compared to conventional types of flapper valve and is moreover simple as well as being capable of withstanding the rigours of operation in a typical FCC unit.

I claim:

1. In a fluid catalytic cracking unit including a cracking riser, a reactor vessel at the top of the cracking riser, a regenerator and at least one cyclone separator for separating cracking catalyst from gases, the separator having a dependent dipleg which has at its lower end a flapper valve for retaining catalyst in the dipleg, the improvement comprising a flapper valve having
    (i) a movable support member hinged to the dipleg about a horizontal hinge axis, which support member is movable about the hinge axis between a closed position and an open position for the valve,
    (ii) a valve seat member at the bottom of the dipleg having a frusto-conical seating surface axially aligned with the dipleg;
    (iii) a valve body member on the support member having a frusto-conical face complementary to the frusto-conical seating surface,
    (iv) an upstanding annular retaining ring around a lower portion of the valve body member, said upstanding annular retaining ring having an innere diameter larger than the outer diameter of the dipleg.

2. A fluid catalytic cracking unit according to claim 1 in which the frusto-conical seating surface of the valve seat member is of a refractory material.

3. A fluid catalytic cracking unit according to claim 2 in which the valve seat member comprises a refractory material.

4. A fluid catalytic cracking unit according to claim 1 in which the frusto-conical face of the valve body member is of a refractory material.

5. A fluid catalytic cracking unit according to claim 1 in which the valve body member comprises a cone frustum of a refractory material.

6. A flapper valve according to claim 1 in which the means for biasing the valve to the valve-closed position comprises a counterweight on the end of the support member arm remote from the valve body member.

7. A fluid catalytic cracking unit according to claim 1 in which the cone angle of the frusto-conical surfaces is not more than 90°.

8. A fluid catalytic cracking unit according to claim 1 in which the valve seat member comprises a cylindrical annular member having the frusto-conical seating surface attached at its lower end and, wherein said cylindrical annular member is attached at its upper end to the dipleg.

9. A fluid catalytic cracking unit according to claim 8 in which the radial thickness of the cylindrical annular member is greater than that of the dipleg.

10. In a fluid catalytic cracking unit having a cracking riser, a reactor vessel at the top of the cracking riser, at least one cyclone separator in the reactor vessel for separating cracking catalyst from gases and passing separated catalyst down a dependent dipleg attached to the bottom of the cyclone separator, a flapper valve at the bottom of the dipleg for retaining catalyst to a predetermined value of the height of catalyst in the dipleg when the valve is in the closed position and releasing catalyst from the dipleg by opening of said flapper valve when the height of catalyst in the dipleg exceeds the predetermined value the improvement comprising said flapper valve having:
    (i) a movable support member hinged to the dipleg about a horizontal hinge axis, which is movable about the hinge axis between a closed position and an open position for the valve,
    (ii) a valve seat member at the bottom of the dipleg having a frusto-conical seating surface axially aligned with the dipleg,
    (iii) a valve body member on the support member having a frusto-conical face complementary to the frusto-conical seating surface.

11. A fluid catalytic cracking unit according to claim 10 in which the cone angle of the frusto-conical surfaces is not more than 90°.

12. A fluid catalytic cracking unit according to claim 10 in which the valve seat member comprises a cylindrical annular member having the frusto-conical seating surface at its lower end, and wherein said cylindrical annular member is attached at its upper end to the dipleg.

13. A fluid catalytic cracking unit according to claim 10 in which the means for biasing the valve to the valve-closed position comprises a counterweight on the end of the support member arm remote from the body member.

* * * * *